June 5, 1945.    H. W. RUSSELL ET AL    2,377,376
APPARATUS FOR RECORDING TEMPERATURE
Filed Oct. 31, 1941    3 Sheets-Sheet 1

INVENTORS
Howard W. Russell.
Charles F. Lucks.
BY
ATTORNEYS

INVENTORS
Howard W. Russell,
Charles F. Lucks
BY
ATTORNEYS

Patented June 5, 1945

2,377,376

UNITED STATES PATENT OFFICE 2,377,376

APPARATUS FOR RECORDING TEMPERATURE

Howard W. Russell and Charles F. Lucks, Columbus, Ohio, assignors, by mesne assignments, to Anchor Hocking Glass Corporation, Lancaster, Ohio, a corporation of Delaware Application October 31, 1941, Serial No. 417,364

3 Claims. (Cl. 234—1.5)

REISSUED
JAN 15 1946

Our invention relates to Apparatus for recording temperature. It has to do, more particularly, with the measurement and recording of temperature at intermittent intervals. It is particularly useful for the measurement and recording of the temperature of glass gobs as they are intermittently fed from the forehearth of a glass melting furnace to a forming machine, although it is not limited thereto.

In the past, various methods have been used for measuring and recording the temperature of moving bodies intermittently spaced. With the prior art methods, various forms of apparatus have been used. In each prior art apparatus an auxiliary energy source, acting on the temperature-sensitive device or recorder of the apparatus, has been used in substitution for the effect obtained when the bodies are in the field of view of the temperature-sensitive device. All of these prior art devices require that the auxiliary energy source be so adjusted that the effect caused by it is equal or nearly equal to the effect caused by exposure of the temperature-sensitive device to the bodies, the temperatures of which are being measured. In general, a change in the temperature of the body will cause an irregular record to be obtained until an equivalent adjustment is made in the auxiliary energy source.

One of the objects of our invention is to provide an apparatus for measuring and recording the temperature of objects at intermittent intervals so as to obtain a continuous temperature record without variations appearing on the record unless a change in temperature of the objects actually takes place.

Another object of our invention is to provide a device which is useful for measuring and recording at intermittent intervals the temperature of both stationary and moving bodies.

Another object of our invention is to provide a device of the type indicated which is particularly useful in the measurement and recording of the temperature of successive glass gobs dropping intermittently from a feeder orifice, so as to obtain a continuous temperature record of the gobs without variations appearing on the record unless a change in temperature of the successive gobs takes place.

Another object of our invention is to provide an apparatus for use in measuring and recording temperature in the manner indicated which requires no auxiliary energy source to act as such on the temperature-sensitive device or recorder which must be adjusted so that the effect caused by it is equal or nearly equal to the effect caused by exposure of the temperature-sensitive device to the bodies being measured.

In the following description, as an example of the application of our method, we have employed moving bodies intermittently spaced, the temperature of which it is desired to measure and record. However, it should be understood that it is also within the scope of our invention to measure and record the temperature of any body, moving or stationary, at intermittent intervals.

The preferred embodiment of our invention is illustrated in the accompanying drawings wherein similar characters of reference designate corresponding parts and wherein.

Figure 1:
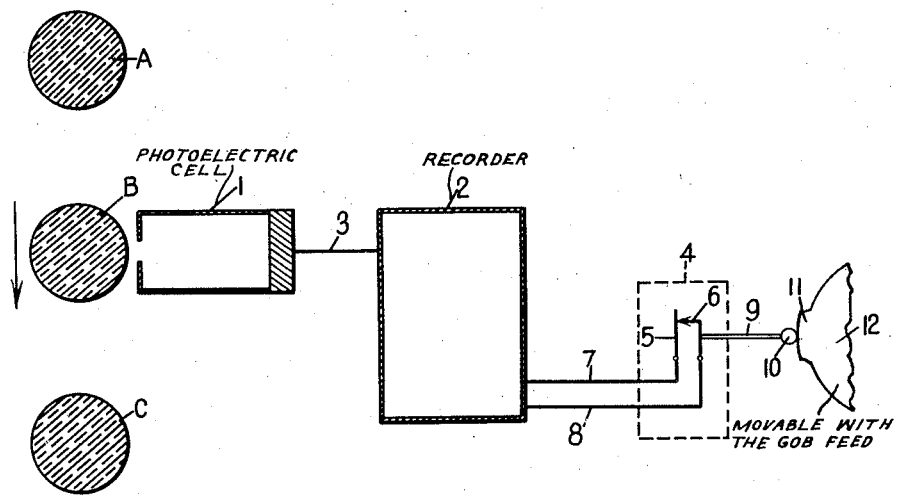
Figure 1 is a schematic illustration of a system we may employ for obtaining a continuous temperature record of moving bodies intermittently spaced.
Figure 2:
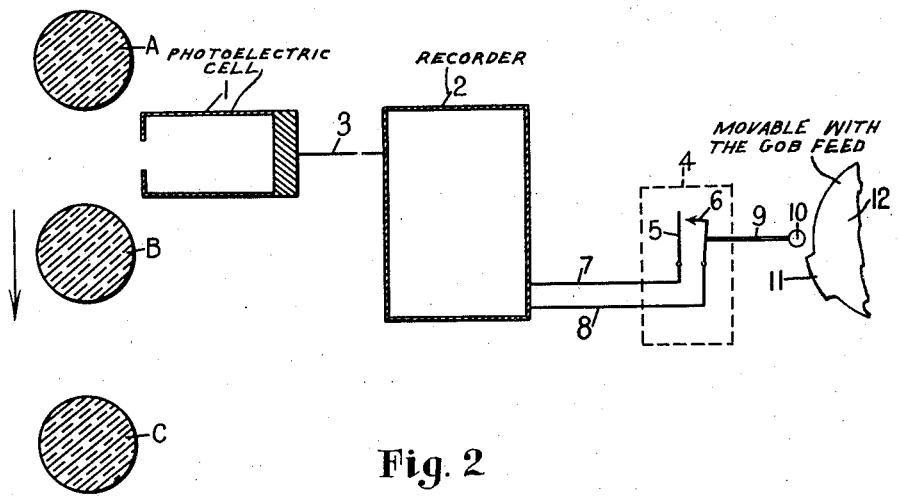
Figure 2 is a similar view but showing the bodies in different positions relative to the temperature-sensitive device.

With reference to the drawings, in Figures 1 and 2, we have illustrated schematically a system which we provide for obtaining a continuous temperature record of moving bodies intermittently spaced. As previously indicated, these moving bodies may be gobs of glass or any other bodies, the temperature of which is to be measured. In these two figures, the bodies B are shown moving in the direction of the arrows. For the sake of clearness, in Figures 1 and 2 the apparatus is not shown in detail but the general system is shown. The details of the apparatus will be described subsequently with reference to Figures 3 and 4.

In Figures 1 and 2, the bodies A, B and C are shown moving past a suitable temperature-sensitive device 1 of satisfactory, and preferably instantaneous, response. A recorder 2 of a suitable type is connected to the temperature-responsive device 1 by any suitable means indicated by the line 3. This recorder 2 is properly designed and calibrated for use with the temperature-sensitive device 1. The connection 3 may be direct, as shown in Figures 1 and 2, or may include a suitable amplifier or converter or combination of both. A switch 4 of a suitable type is connected to the recorder 2. This switch includes two contact members 5 and 6 connected to the recorder 2 by means of wires 7 and 8. As will be described later, the switch 4 controls the operation of the recorder 2. The contact 6 of the switch is moved by means of a link 9 and a cam-operated roller 10. A cam 11 is provided for actuating the roller 10 and the link 9. This cam 11 is carried by a suitable support 12 which is moved in synchronism with the movement of the bodies B. The cam 11, or a plurality of these cams, is adapted to close the switch 4 each time a body B passes before the temperature-sensitive device 1.

In Figure 1, we have shown the body B in position to cover the whole field of action of the temperature-sensitive device 1. At this time, the cam 11 has forced the contact 6 into contact with the contact 5. Closing of switch 4 in this manner permits the recorder 2 to move in response to the output of the temperature-sensitive device 1 and thus record the temperature of the body B which is in the field where it produces its effect on the temperature-sensitive device 1. In Figure 2, we have shown the body B out of the field where it acts on the temperature-sensitive device 1. The output of the temperature-sensitive device 1 has, consequently, decreased from the constant maximum value when body B covered its whole field of action to a value depending on the positions of bodies A and B with respect to the field of action of the temperature-sensitive device 1. The output of the device 1 will again reach a constant maximum value when the body A covers the whole field of action thereof. When, as in Figure 2, the whole field of action of the temperature-sensitive device 1 is not covered by one of the bodies, the contacts 5 and 6 of switch 4 will be open, due to the position of cam 11, which will cause the recorder to remain in the position it last reached when body B covered the whole field of action of the temperature-sensitive device 1. As previously indicated, the operation of switch 4 is synchronized with the movement of the bodies A, B and C so that the contacts 5 and 6 thereof are closed by cam 11, attached to a moving support 12 only when one of the bodies covers the whole field of action of the temperature-sensitive device 1. At all other times, the contacts 5 and 6 are open.

If during the time the recorder 2 is permitted to respond to the output of the temperature-sensitive device 1, sufficient time does not elapse for the recorder to move into position for recording the temperature of the body, it will do so after several bodies have passed the temperature-sensitive device 1 and the recording member thereof will attain and remain at the proper temperature point on the record. A change in the temperature of the bodies successively passing the temperature-sensitive device 1 will cause the recording member of the recorder to move to a point corresponding to the new temperature. Thus, by permitting the recorder 2 to be active only during the time the whole field of action of the temperature-sensitive device 1 is covered by a body, such as B, and maintaining the recorder in its previous position when the whole field of action of the device 1 is not covered, a continuous temperature record is obtained without variations appearing on the record unless there is a difference in the temperature of successive bodies.

In some instances controlling the recorder mechanism 2 so that it responds only when the whole field of action of the temperature-sensitive device 1 is covered, may best be accomplished by reversing the action of the switch contacts 5 and 6. In fact, devices other than the switch may be used to accomplish the desired end without departing from the spirit of this invention. The method of controlling the response of the recorder mechanism may be accomplished in various ways depending upon the type of recorder used and what means it employs for bringing the recording member to position for recording temperature. One example, is the opening and closing of the balancing motor circuit of a recorder using such a motor for movement of the recording pen. Another example, is pen movement caused by the position of a galvanometer or millivoltmeter pointer, in which case a clamp actuated by means of a solenoid controlled by a switch, or an air bellows controlled by a piston, might be used. It should be clear, that although recorders only have been mentioned as the means of translating the output of the temperature-sensitive device 1 to a temperature record, it is also within the scope of this invention to use devices such as those classed as temperature indicators, controllers, indicator controllers, and recorder controllers.

Figure 3:
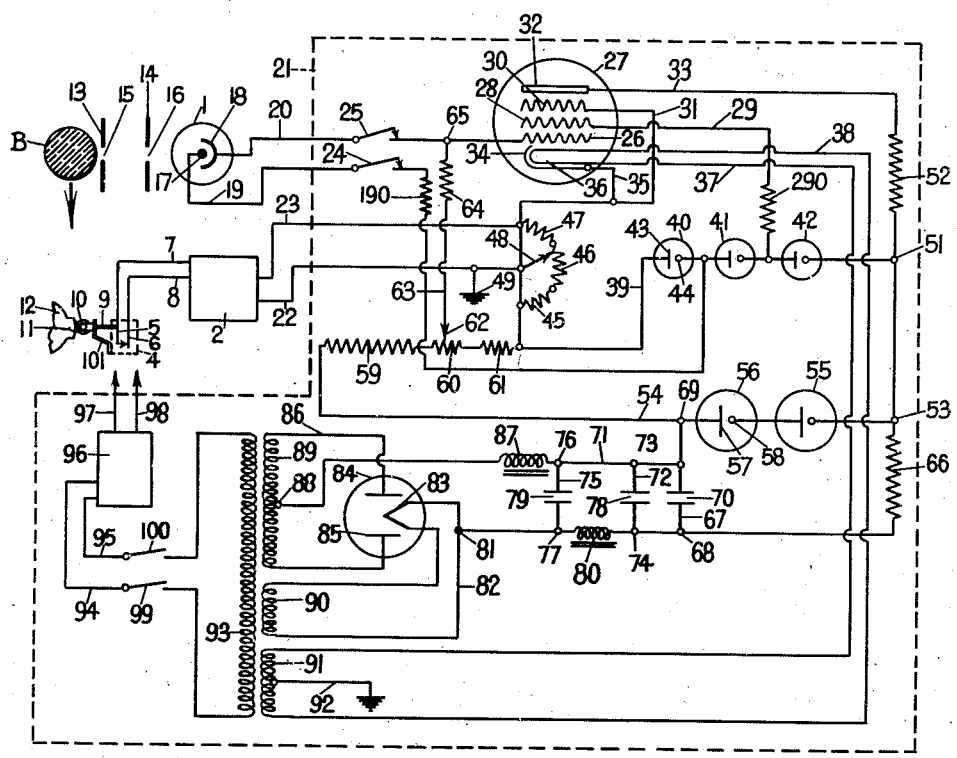
Figure 3 is a diagrammatic view illustrating apparatus which may be employed for measuring and recording the temperature of glass gobs as they are dropped from the feeder.
Figure 4:
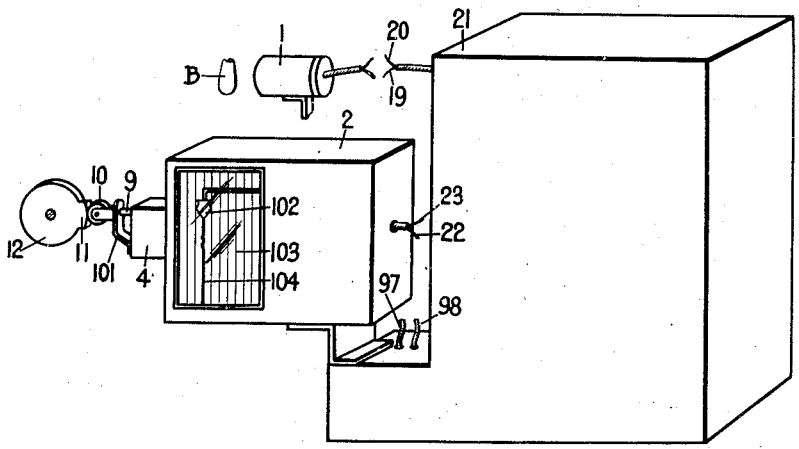
Figure 4 is a view illustrating generally the various units of which our apparatus may be constituted.

In the production of glassware by machine, molten glass from the melting tank flows into a heated feeder or spout. The flow of glass from the feeder to the machine may be controlled by a needle or plunger synchronized with the molding or forming machine. For each piece of ware, glass flows out of an orifice at the end of the feeder and at the proper time is sheared to a charge or gob of glass of predetermined size which drops into a mold on the forming machine. Normal rates of production require that the charge of glass or gob is started, formed and sheared in about one second. In order to measure and record the temperature of the gob, the temperature-sensitive device and recorder must have an effective response time which is much less than one second. Of the radiant-energy sensitive devices now in use, certain types of photocells have the necessary response. Present recorders, such as the potentiometer and millivoltmeter types, will not attain a balance point in a period less than one second. If a recorder with a sufficient short time of response could be obtained in the art, it would, when connected to the proper temperature-sensitive device, sighted on glass gobs leaving the feeder orifice, yield an irregular record with only the peaks of the record curve having value. The reading of the record would thus be difficult and confusing. However, the device which we provide can by our method produce a continuous temperature record of the gob temperature without variations appearing on the record unless there is a difference in the temperature of successive gobs. In Figures 3 and 4, we have illustrated a method and device by which this result may be accomplished.

In Figure 3, we show a body B which may be a gob of glass that has just been formed and is passing through a suitable path to a mold on the glass-forming machine. At the desired location in this path it covers the whole field of view of the temperature-sensitive device 1 which, in this instance, is a radiant energy sensitive device such as a photoelectric cell. The field of view of the photoelectric cell 1 is restricted by means of spaced diaphragms 13 and 14 having aligning openings 15 and 16, respectively. The anode 17 and the cathode 18 of the photoelectric cell 1 are connected by wires 19 and 20 respectively to an A. C. operated D. C. amplifier indicated generally by the numeral 21 directed to the dotted line which encloses the various parts thereof. The recorder 2 is connected to the amplifier 21 by means of lines 22 and 23. The lines 19, 20, 22 and 23 correspond to the connecting means 3 of Figures 1 and 2 for connecting the temperature-sensitive device 1 to the recorder 2. Radiant energy from the gob B will pass through the openings 15 and 16 of diaphragms 13 and 14 and will activate photoelectric cell 1. The output from photoelectric cell 1 is amplified by the amplifier 21. The output from amplifier 21 is applied through the lines 22 and 23 to the recorder 2 causing it to record the temperature of gob B.

The elements of amplifier 21 are designed to give a constant output of sufficient intensity to operate recorder 2 and are such that variations in the output of photoelectric cell 1 will cause corresponding changes in the output of the amplifier 21. Any amplifier possessing these qualities may be substituted for the circuit shown in Figure 3 without departing from the spirit of this invention. In fact, it may be preferable to use an A. C. amplifier or a D. C.-A. C. converter and an A. C. amplifier. In some cases no amplifier may be required.

The amplifier circuit shown in Figure 3 will now be described in detail. The numerals 24 and 25 designate the poles of a single-throw double-pole switch connected in the lines 19 and 20. The line 20 is connected to a grid 26 of pentode tube 27. The screen 28 of this tube is connected to a line 29 and the suppressor 30 thereof is connected to a line 31. The cathode 34 of this tube is connected by line 35 to line 31 while the filament 36 of this tube is connected to lines 37 and 38. Line 29 is provided with a resistor 290. The line 29 is connected to a line 39 in which is interposed two 75-volt voltage-regulating tubes 40 and 41 and a 90-volt voltage-regulating tube 42. Each of these tubes includes a cathode 43 and an anode 44. The line 39 is also connected to resistors 45, 46 and 47, which are connected to each other. The resistor 47 is connected by the line 31 to the suppressor 30 of the tube 27. The line 31 is also connected to the line 23 leading to recorder 2. The line 22 is connected to a variable contact 48 which cooperates with resistors 45, 46 and 47. Line 22 is grounded as at 49. The line 19 is also connected to the line 39 between the tubes 40 and 41. Line 19 is provided with a resistor 190. The line 33 is connected to the line 39 at the point 51. In the line 33 between the plate 32 of tube 27 and the point 51, a load-resistor 52 is interposed. The line 33 is also connected at the point 53 to a line 54. This line 54 has interposed therein two 150-volt voltage-regulating tubes 55 and 56. Each of these tubes includes a cathode 57 and an anode 58. The line 54 is connected to a limiting resistor 59 which is connected to a voltage supply resistor 60 which, in turn, is connected to another voltage supply resistor 61 that is connected to line 39. A variable contact 62 is associated with the resistor 60 and is connected by a line 63, which includes a grid resistor 64, to the line 20 at the point 65. Beyond the point 53 in the line 33 a limiting resistor 66 is incorporated. A line 67 connects the lines 33 and 54 at points 68 and 69 beyond the resistor 66 and tube 56 respectively. In this line 67 a filter condenser 70 is incorporated. A line 71 leads from the line 67. A shunt line 72 is connected to line 71 at the point 73 and to line 33 at the point 74. A second shunt line 75 is connected to line 71 at the point 76 and to line 33 at the point 77. Line 72 has a filter condenser 78 incorporated therein while line 75 has a filter condenser 79 incorporated therein. A filter choke 80 is disposed in line 33 between the points 74 and 77. Beyond the point 77 the line 33 is connected at the point 81 to the filament circuit 82 which includes the filament 83 of a rectifying tube 84. The two plates 85 of this tube are connected in a plate circuit 86. Beyond the point 76, the line 71 is provided with a filter choke 87. The end of this line 71 is connected to the center tap 88 to the high-voltage secondary 89 of a power transformer. The secondary 89 is incorporated in the plate circuit 86. The filament circuit 82 of tube 84 includes a low-voltage secondary 90 of a power transformer. The lines 37 and 38 running from filament 36 of tube 27 are connected to a low-voltage secondary 91 of a power transformer. The secondary 91 is grounded at the center tap by a ground wire 92. The primary 93 of the power transformer is connected by lines 94 and 95 to a voltage regulator 96. This voltage regulator 96 may be connected to lines 97 and 98 leading from a 110-A. C. current supply. Poles 99 and 100 of a single-throw double-pole switch are incorporated in the respective lines 94 and 95. The recorder 2 is connected by lines 7 and 8 to the switch 4, as previously described.

The operation of the amplifier is as follows: With switch contacts 24 and 25 open, that is, with photoelectric cell 1 disconnected from the amplifier 21, the grid bias potential applied to grid 26 of pentode 27 is adjusted by sliding contact 62 along resistor 60 so that the output of the amplifier 21 is sufficient to operate recorder 2. After this initial adjustment, contacts 24 and 25 are closed and the output of photoelectric cell 1, acting through resistor 64, controls the grid bias potential of grid 26. Variations in the potential of grid 26 cause variations in the output of pentode 27. The output of pentode 27 is made effective upon the recorder 2 through connections 22 and 23 leading from the recorder 2 to the resistors 45, 46 and 47 in the cathode 34 side of the output circuit of pentode 27. Movable contact 48, connected to line 22, provides an additional selection for the amount of initial output and variations in output from amplifier 21 that is applied to the recorder 2.

As previously indicated, the recorder 2 is connected by the wires 7 and 8 to the switch 4. As indicated in Figures 3 and 4, this switch may be actuated by the roller 10 which is carried by a spring 101 secured to the housing of the switch 4. Movement of the roller 10 will cause movement of the link 9 which will cause the contacts 5 and 6 of the switch 4 to engage each other. This movement of the roller 10, as previously explained, may be caused by a cam 11. This cam 11 may be supported on a movable support 12 which, for example, may be a rotating disk as shown in Figure 4. Rotation of this disk 12 will be timed with the intermittent feed of the glass gobs so that each time a gob covers the entire field of view of the photoelectric cell 1, the circuit to the recorder 2 will be completed by switch 4 but at all other times the circuit will be broken. Thus, the recorder will only record temperatures while a body is in the field of view of the photoelectric cell 1. Therefore, no variations will appear on the temperature record unless there is variation in temperature in the successive glass gobs. It is to be understood that any suitable temperature recorder now commonly in use may be employed. The recorder 2 shown in Figure 4 is provided with a pen 102. Movement of this pen 102 may be controlled in any suitable manner such as by a balancing motor of a series split field wound type. This recorder is provided with a chart 103 and it will be noted that the temperature indicating line 104 made by the pen 102 on the chart will normally be a straight line.

Figure 5:
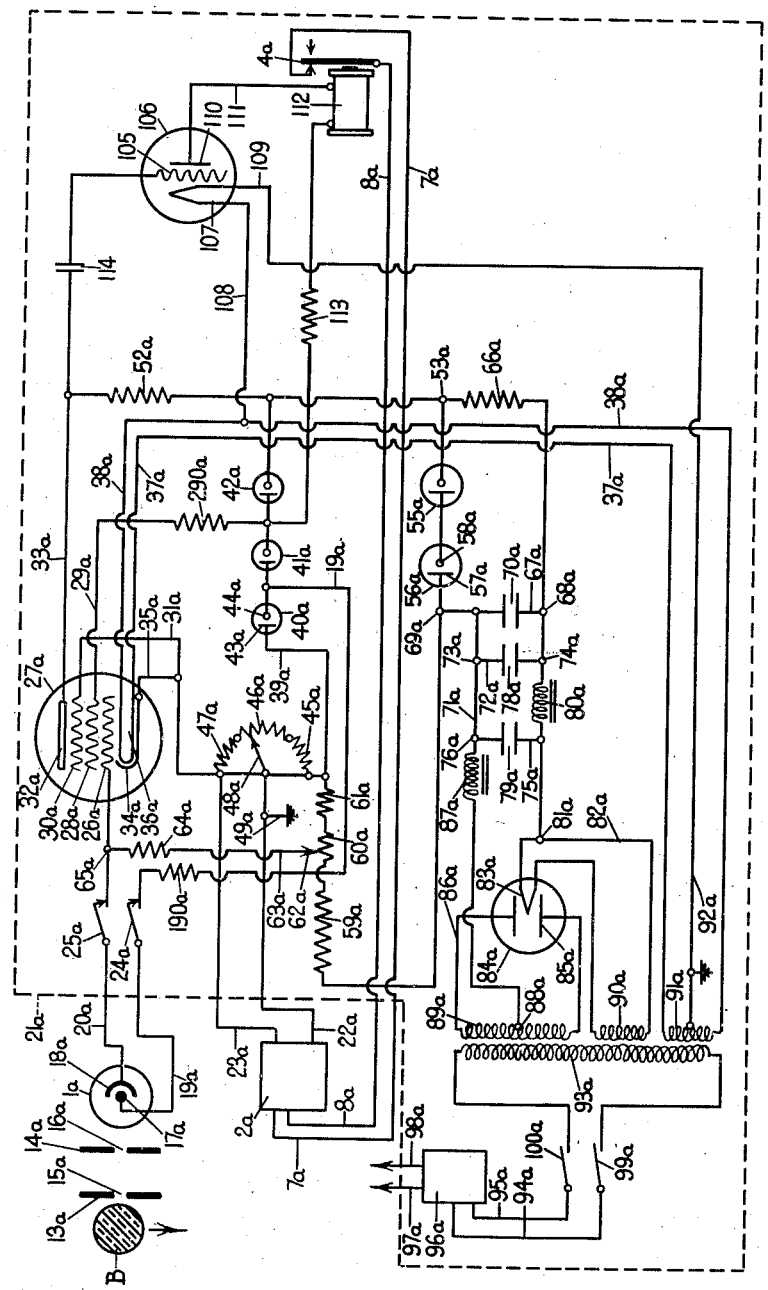
Figure 5 is a view similar to Figure 3 but illustrating another form of apparatus which we may employ.

In Figure 5, we have illustrated a modification of apparatus which we may employ. This apparatus is similar to that shown in Figure 3 but, in this instance, instead of employing a cam-operated switch for rendering the recorder operative, when the gob is in the field of view of the photoelectric cell, we employ a relay controlled switch which is actuated by the photoelectric cell when a gob moves into the field of view thereof. In this figure, the parts corresponding to these shown in Figure 3 are designated with the same numeral having the suffix $a$.

In this form of the apparatus the circuit, in the main, is like that of Figure 3. However, the line 33a leading from the plate 32a of tube 27a is connected to the grid 105 of an amplifying tube 106. The filament 107 of this tube is connected, by a line 108, to the line 33a and, by a line 109, to the line 82a connected to the secondary 91a of the transformer. The plate 110 of tube 106 is connected by a line 111 to a relay 112 which is also connected to the line 29a. Line 29a is provided with a resistor 113 and line 33a is provided with a condenser 114. The relay 112 operates the switch 4a which is connected by lines 7a and 8a to the recorder 2a.

In the operation of this form of the apparatus, when a gob B moves into the field of view of photoelectric cell 1a, the plate current produced in the tube 27a will be effective on the grid 105 of the tube 106 in order to operate relay 112 and close switch 4a thus causing the recorder 2a to function. As soon as gob B moves out of the field of view of cell 1a, the relay will be deenergized, allowing the switch 4a to open and render the recorder inoperative. Thus, the recorder will function only when a gob is in the field of view of the photoelectric cell 1a.

It will be apparent that with our apparatus, the temperature recorder will function only when each of the successive gobs is in position to cover the whole field of view of the photoelectric cell. This will result in a continuous temperature record of the gobs without variations appearing on the record unless a change in temperature of the successive gobs takes place. The apparatus requires no auxiliary energy source to act as such on the temperature-sensitive device or recorder which must, as in the prior art, be adjusted so that the effect caused by it is equal or nearly equal to the effect caused by exposure of the temperature-sensitive device to the bodies being measured. Our apparatus is useful for measuring and recording temperature of spaced moving bodies, as described, but it may also be employed to measure and record the temperature of any body, moving or stationary, at intermittent intervals.

Various other advantages will be apparent from the preceding description, the drawings and the following claims.

Having thus described our invention, what we claim is:

1. Apparatus for measuring and recording the temperature of gobs of glass fed intermittently from a glass feeder, comprising a photoelectric cell disposed adjacent the path of travel of said gobs whereby the gobs will move successively into the field of view of the cell, a recorder of an electrically operated type, means for interconnecting said recorder and said photoelectric cell and including an amplifying circuit, and means timed with the travel of said gobs of glass whereby said recorder will be operative when the successive gobs move into the field of view of the photoelectric cell and inoperative when said gobs move out of the field of view of said cell.

2. Apparatus according to claim 1 wherein said last-named means comprises a circuit connected to said recorder, and cam-controlled means timed with the travel of said glass gobs past said photoelectric cell for making and breaking the circuit.

3. Apparatus for measuring and recording the temperature of gobs of glass fed intermittently from a glass feeder, comprising a photoelectric cell disposed adjacent the path of travel of said gobs whereby the gobs will move successively into the field of view of the cell, an electrically actuated recorder including a movable pen, a circuit associated with the recorder, and cam-controlled means timed with the movement of said glass gobs past said photoelectric cell for making and breaking said circuit whereby said recorder will be operative when the successive gobs move into the field of view of the photoelectric cell and inoperative when said gobs move out of the field of view of said cell.

HOWARD W. RUSSELL.
CHARLES F. LUCKS.